US007930555B2

(12) United States Patent
Bell

(10) Patent No.: US 7,930,555 B2
(45) Date of Patent: Apr. 19, 2011

(54) IMAGE RECOGNITION

(75) Inventor: David A. Bell, London (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 1591 days.

(21) Appl. No.: 10/528,678

(22) PCT Filed: Sep. 5, 2003

(86) PCT No.: PCT/IB03/03897

§ 371 (c)(1), (2), (4) Date: Mar. 21, 2005

(87) PCT Pub. No.: WO2004/029885

PCT Pub. Date: Apr. 8, 2004

(65) Prior Publication Data

US 2005/0280502 A1 Dec. 22, 2005

(30) Foreign Application Priority Data

Sep. 24, 2002 (GB) .................................. 0222113.3

(51) Int. Cl.
*G06F 21/24* (2006.01)
*G06K 9/20* (2006.01)

(52) U.S. Cl. ....... 713/186; 340/5.83; 340/5.74; 382/118

(58) Field of Classification Search .................. 713/182, 713/186, 118; 382/118, 119, 115; 340/5.74, 340/5.8, 5.82, 5.83, 5.81, 8.82; 463/43; 705/80
See application file for complete search history.

(56) References Cited

U.S. PATENT DOCUMENTS 5,760,917 A * 6/1998 Sheridan ....................... 358/442
5,790,074 A * 8/1998 Rangedahl et al. ...... 342/357.13
5,825,871 A * 10/1998 Mark ....................... 379/357.03
5,991,429 A * 11/1999 Coffin et al. .................. 382/118
6,035,055 A * 3/2000 Wang et al. ................... 382/118
6,038,333 A * 3/2000 Wang ............................ 382/118
6,142,876 A 11/2000 Cumbers
6,188,777 B1 2/2001 Darrell et al.
6,571,216 B1 * 5/2003 Garg et al. ...................... 705/14
6,658,414 B2 * 12/2003 Bryan et al. ...................... 707/9
6,819,219 B1 * 11/2004 Bolle et al. ................... 340/5.52
6,868,391 B1 * 3/2005 Hultgren ......................... 705/26
6,886,000 B1 * 4/2005 Aggarwal et al. ............... 705/80
6,990,587 B2 * 1/2006 Willins et al. ................. 713/182
7,472,824 B2 * 1/2009 Ramachandran ............. 235/379
7,487,112 B2 * 2/2009 Barnes, Jr. ...................... 705/26

(Continued)

FOREIGN PATENT DOCUMENTS

EP 0944019 A 9/1999

(Continued)

*Primary Examiner* — Eleni A Shiferaw

(57) ABSTRACT

A system and method for obtaining information relating to a person, such as contact details, without face-to-face, verbal or other contact. The apparatus uses an image recognition system for obtaining personal information related to a target person, and includes: an image acquisition device for capturing an image of a target person; a database of stored image data items each relating to one of a plurality of candidate persons, each image data item being associated with stored personal data relating to the respective candidate person; a search engine for matching the captured image of the target person to a candidate person image data item and retrieving the personal data relating thereto; a display device for displaying the personal data relating to the target person; and control device, operable by each candidate person, to control third party access to the stored personal data relating to the candidate person.

17 Claims, 3 Drawing Sheets

U.S. PATENT DOCUMENTS

Figure 1:
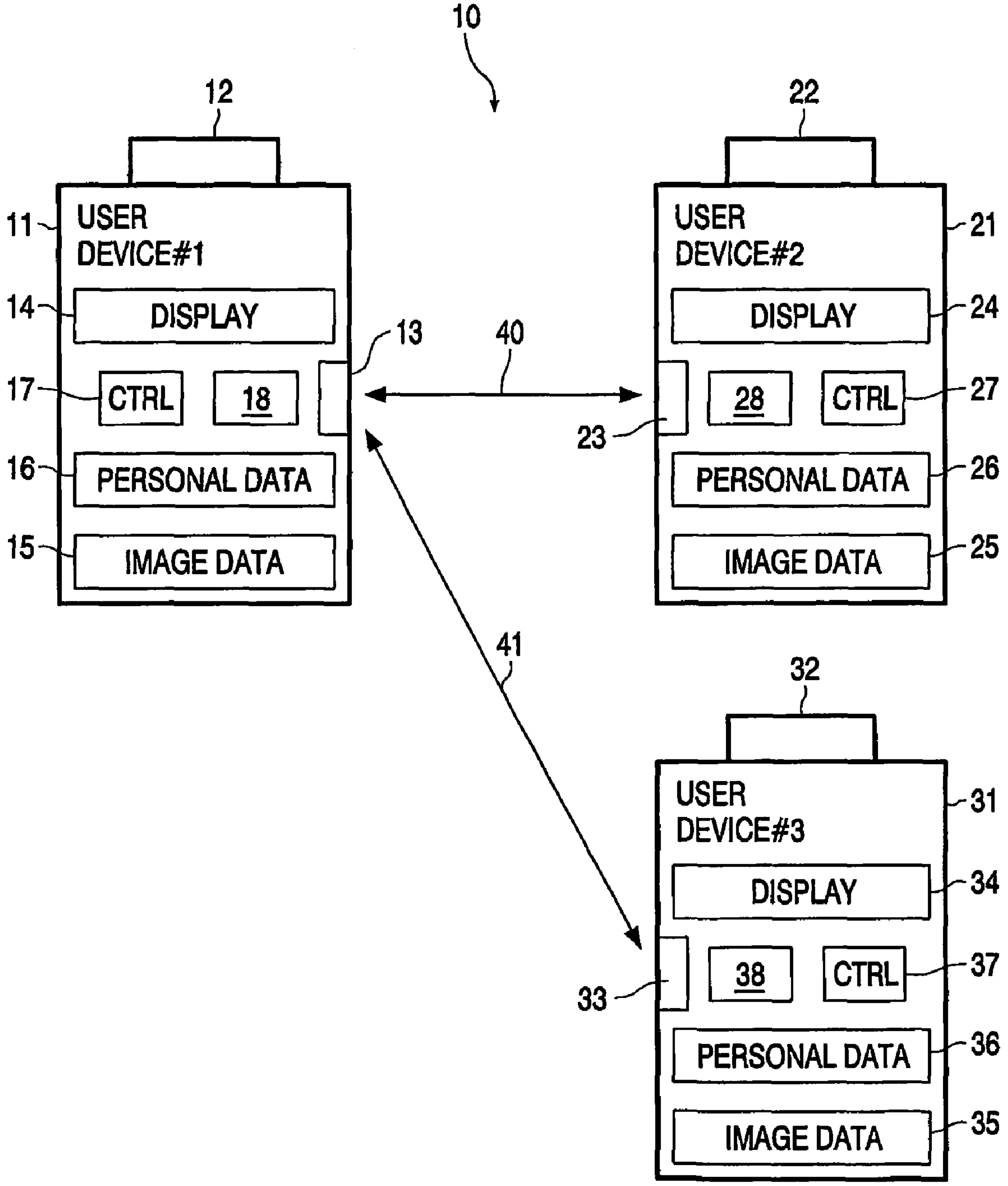

| | | | | |
|---|---|---|---|---|
| 2002/0047798 | A1 * | 4/2002 | Platt | 342/357.12 |
| 2002/0175211 | A1 * | 11/2002 | Dominquez et al. | 235/492 |
| 2003/0050979 | A1 * | 3/2003 | Takahashi | 709/204 |
| 2003/0063004 | A1 * | 4/2003 | Anthony et al. | 340/574 |
| 2003/0236120 | A1 * | 12/2003 | Reece et al. | 463/42 |
| 2004/0148290 | A1 * | 7/2004 | Merenda et al. | 707/10 |
| 2004/0249846 | A1 * | 12/2004 | Randall et al. | 707/102 |

FOREIGN PATENT DOCUMENTS

| | | |
|---|---|---|
| WO | WO 0244855 A | 6/2002 |

* cited by examiner

IMAGE RECOGNITION

The present invention relates to image recognition systems, and in particular to systems adapted to provide matching of an electronically captured facial image with images in a database.

A number of facial recognition systems are known in the art. For example, U.S. Pat. No. 5,991,429 describes a facial recognition system in which images of individuals given security clearance access are stored on a database. Surveillance cameras are able to compare captured images with those in the database to verify security clearance of a target person.

U.S. Pat. No. 6,038,333 describes a recognition system suitable for integration into a portable device such as a PDA, having a camera and a display screen. Face feature information from a captured image is compared with an image database to find similar faces. Personal information relating to the retrieved faces can be displayed in order that a user can recollect previous personal contacts made.

U.S. Pat. No. 6,142,876 describes a facial recognition system for tracking players using gaming systems. U.S. Pat. No. 6,035,055 describes a content analyser for determining content data of scanned images used for image comparison without retrieval of pixel data of the stored images. U.S. Pat. No. 6,188,777 describes a system for identifying and tracking a person's image within a moving scene., Generally, interpersonal communication is made possible by the availability of phone numbers, e-mail addresses and other contact information, which are publicised in some way or exchanged between individuals. Conventionally, in a social or business meeting environment, contact information exchange has been verbal, by business card or by other written medium. More recently, personal electronic devices such as PDAs are able to exchange such information using infra-red or other wireless links.

In some circumstances, it may not be possible to achieve the proximity to a person required to request an exchange of contact details. For example, the target person may be occupied in discussion or in some other task. In other circumstances, it may be undesirable to initiate face-to-face contact with a target person until such time as the identity of, or other information about, the target person is known.

It is an object of the present invention to provide a means for obtaining information relating to a person, such as contact details, without face-to-face, verbal or other close contact.

According to one aspect, the present invention provides an apparatus for obtaining personal information related to a target person, comprising:

an image acquisition device for capturing an image of a target person;

a database of stored image data items each relating to one of a plurality of candidate persons, each image data item being associated with stored personal data relating to the respective candidate person;

a search engine for matching the captured image of the target person to a candidate person image data item and retrieving the personal data relating thereto;

an output device for presenting, to a user, the personal data relating to the target person; and control means, operable by each candidate person, to control third party access to the stored personal data relating to the candidate person.

Optionally the database is a distributed database, candidate persons each having a portable device for storing their own image data items and personal data which may be accessed by the search engine using a wireless communication channel.

Optionally, the control means comprises an access control function provided on each portable device.

The database may include a central repository accessible to a plurality of remote portable devices using a wireless communication channel. In this case the control means may be a distributed control means, candidate persons each having a device for storing their own image data items and personal data onto the database and determining third party access rights thereto.

The image acquisition device, output device and control means can be integrated into a portable electronic device. The portable electronic device may be any of a personal digital assistant, personal computer or mobile telephony device. The portable electronic device may further include communication means for communication with a remotely located database and the search engine.

The output device can be a display device for displaying the personal data relating to the target person.

According to another aspect, the present invention provides a portable device for obtaining personal information related to a target person, comprising:

an image acquisition device for capturing an image of a target person;

means for accessing a remote database of stored image data items each relating to one of a plurality of candidate persons, each image data item being associated with personal data relating to the respective candidate person;

means for retrieving the personal data relating to a candidate person for which the captured image data of the target person matches the stored image data item of the candidate person;

an output device for presenting, to a user, the retrieved personal data relating to the target person; and control means to control third party access to the database of personal data relating to a candidate person.

Optionally, the means for accessing and the means for retrieving include a wireless communication device. The wireless communication device may be adapted to communicate with a plurality of corresponding devices, the corresponding devices together forming the remote database.

The portable device can be integrated with any of a personal digital assistant, personal computer or mobile telephony device.

The output device can be a display device for displaying the personal data relating to the target person.

According to another aspect, there is provided a computer program product, comprising a computer readable medium having thereon computer program code means adapted, when said program is loaded onto a computing apparatus, to make the computing apparatus form the device.

According to another aspect, there is provided a computer program, distributable by electronic data transmission, comprising computer program code means adapted, when said program is loaded onto a computing apparatus, to make the computing apparatus form the device.

According to another aspect, the present invention provides a system for providing personal information related to a target person, comprising:

a database of stored image data items each relating to one of a plurality of candidate persons, each image data item being associated with personal data relating to the respective candidate person;

means for receiving, from a remote image acquisition device, a captured image of a target person;

a search engine for matching the captured image of the target person to a candidate person image data item and retrieving the personal data relating thereto;

means for transmitting, to a remote output device, the personal data relating to the target person; and control means, operable by each candidate person to control third party access to the stored personal data relating to the candidate person.

The means for receiving and the means for transmitting can include a wireless communication link.

The means for receiving and the means for transmitting can include an internet connection.

According to another aspect, the present invention provides a method of obtaining information related to a target person, comprising the steps of:

capturing an image of a target person;

supplying image data from the captured image to a database of stored image data items each relating to one of a plurality of candidate persons, each image data item being associated with personal data relating to the respective candidate person;

searching the database to match the captured image of the target person with a candidate person image data item and retrieving the personal data relating thereto;

outputting the personal data relating to the target person; and maintaining the database by enabling control, by each candidate person, of third party access to the personal data relating to that candidate person.

These and other aspects of the present invention appear in the appended claims which are incorporated herein by reference and to which the reader is now referred.

Figure 2:
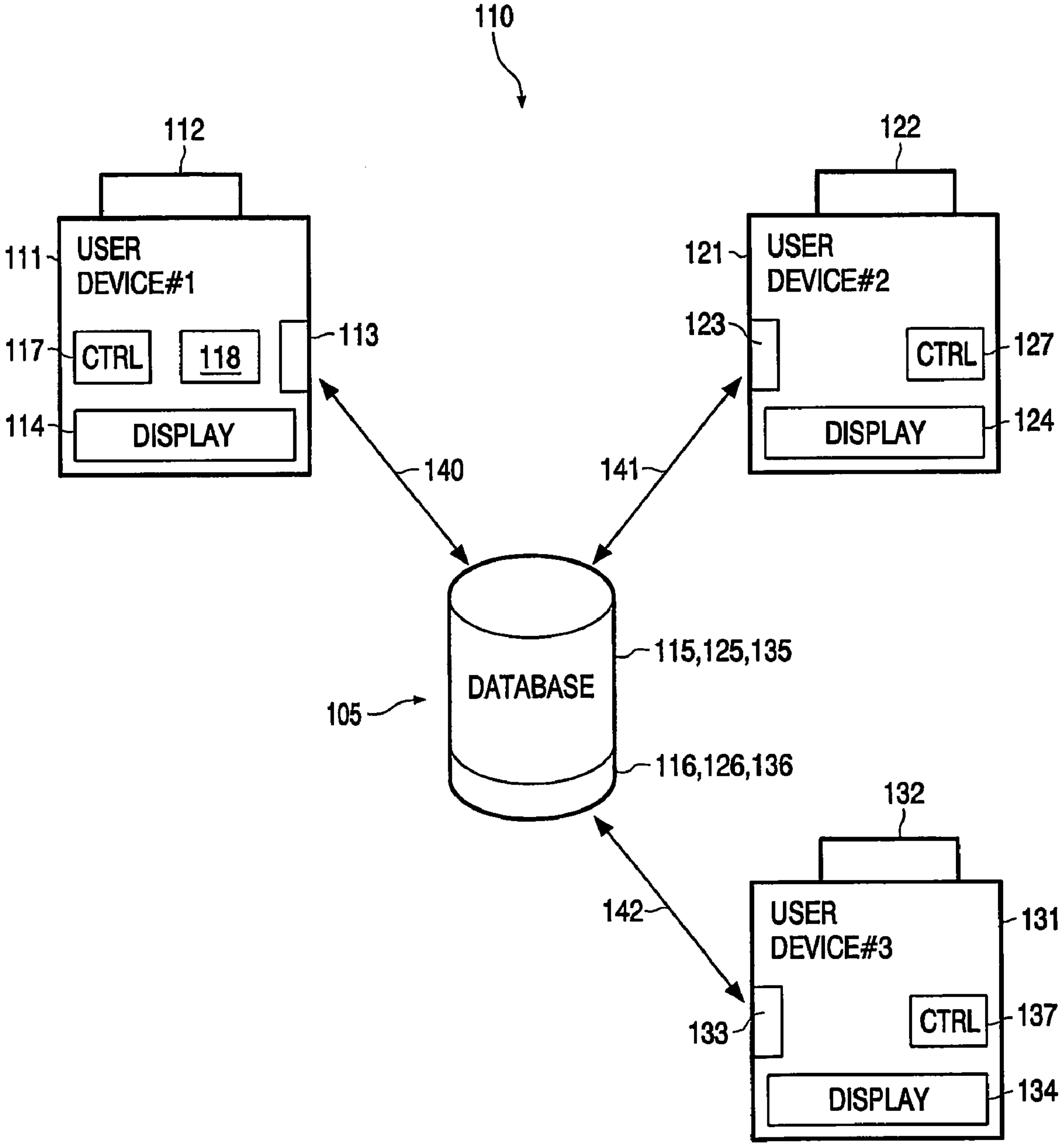
Figure 3:
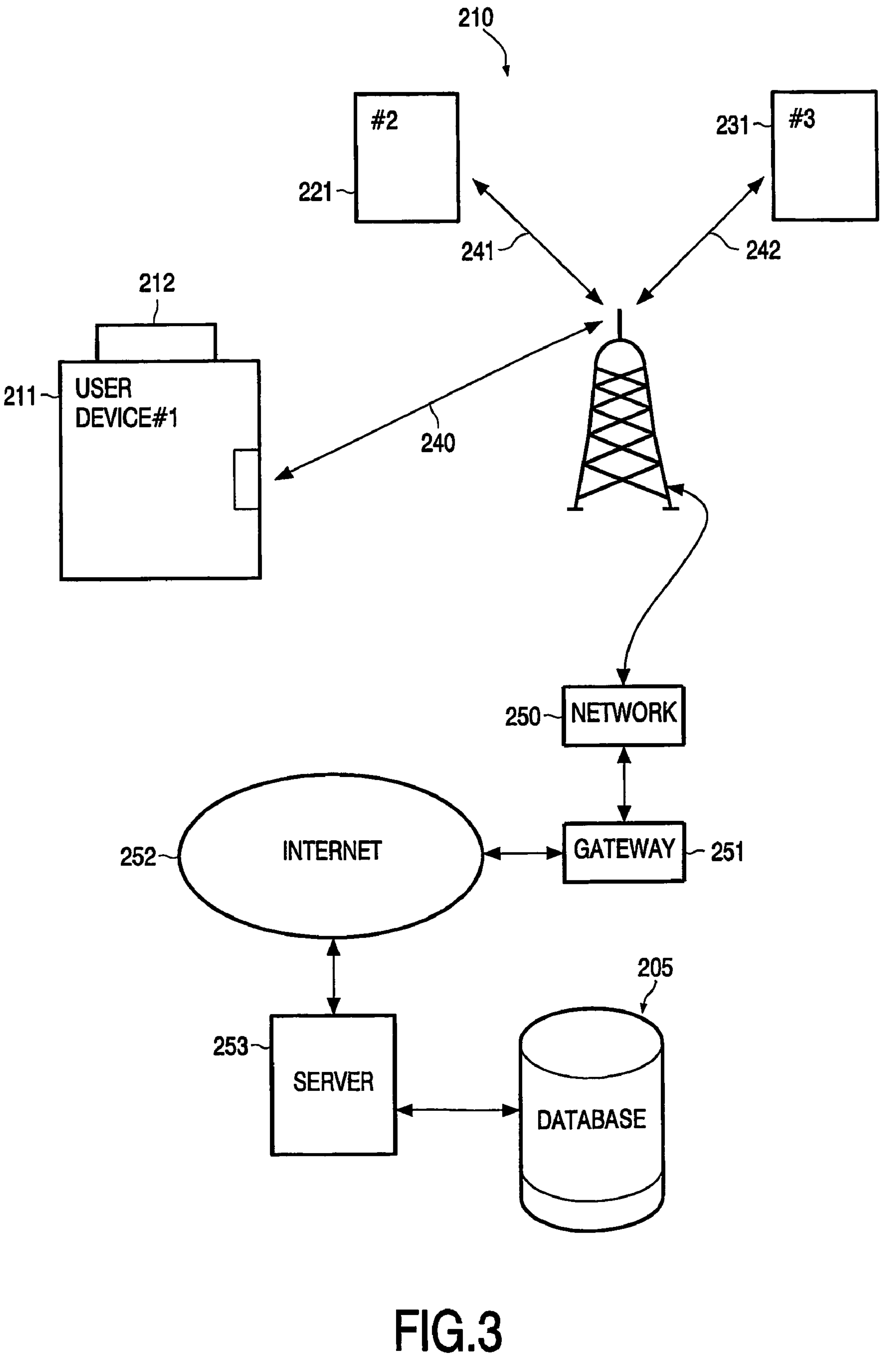

Embodiments of the present invention will now be described by way of example only and with reference to the accompanying drawings in which:

FIG. 1 shows a schematic block diagram of apparatus for retrieving personal data corresponding to a recognised image, in which a database of image data is distributed across a plurality of participating devices;

FIG. 2 shows a schematic block diagram of apparatus for retrieving personal data corresponding to a recognised image, in which a database of image data is centralised for access by a plurality of participating devices; and FIG. 3 shows a schematic block diagram of apparatus for retrieving personal data corresponding to a recognised image, in which a database of image data is centralised for remote access by a plurality of participating devices.

The present invention provides a means for one person (a "participating user") to obtain contact details or other personal information relating to another person (a "target person") using a process of image capture and image matching. Each user of the system provides their image and personal data for storage in a database of images and corresponding personal data (of "candidate persons"), which database is made accessible to participating users.

The expressions "image" or "image data" are used herein to refer to data that is necessary to readily identify and/or distinguish one candidate person from other candidate persons, using an image captured by an appropriate image acquisition device such as a digital camera.

The image data may be stored in a candidate person image database in any appropriate form, to include compressed and uncompressed file formats, raw image data or pre-processed image data, or as essential parametric data derived from raw image data which parametric data is sufficient to facilitate image recognition and matching operations or to assist therein.

With reference to FIG. 1, a first arrangement of apparatus 10, using a distributed database of image and personal data, is shown.

A first participating user device 11 includes a digital image acquisition device 12, such as a digital camera, for capturing an image of a target person. The user device 11 further includes a communication device 13 for effecting data transfer with other user devices. The communication device may be of any suitable type for the intended use.

For short range use, the communication device 13 may be an infrared or optical transmitter/receiver, or a short range radio device such as that prescribed by the Bluetooth standards. Alternatively, the communication device 13 could be implemented using cellular telephone technology, such as GSM or GPRS.

The user device 11 incorporates a display 14 for displaying at least alphanumeric data, and preferably also graphical data. The user device further includes a memory for storing image data 15 providing an image of the user and personal data 16 relating to the user. The image data 15 may take any of the forms as defined above.

The personal data 16 may include any data that is specific to the user of the device, to include any of such items as name, address, telephone number, fax number, e-mail address, professional information including job title, employer details, membership of professional bodies and/or specialist interest groups, social information such as hobbies, membership of or affiliation with clubs and societies and the like. In a preferred embodiment, the personal data may comprise a standardised format such as that used for V-card business card exchange.

An aspect of the invention is that the user has control over the accessibility to third parties of the user's personal data 16 stored on the user's device 11. The user of the device 11 is able to insert, edit and restrict the availability of the personal data 16 using a control function 17.

For example, the control function 17 may be used to allow full access to the personal data by third parties, or alternatively to allow only restricted access to portions of the data at any given time. In this way, the personal data may be divided into business and pleasure categories, with the user allowing only third party access to business data during, for example, use in a business environment.

The control function may also be used to restrict access only to certain categories of third party.

The user device also includes a microprocessor 18 for effecting all necessary data processing operations. In preferred embodiments, the user device 11 may be integrated with a personal digital assistant (PDA) type device, a palmtop or laptop computer, a mobile telephone, a personal communicator or other suitable electronic device.

Other participating users of the system each have a respective user device, illustrated as user devices 21 and 31. Each user device 21, 31 is preferably substantially identical to the first user device 11 except, of course, in that there is different respective image and personal data 25, 26, 35, 36 stored therein.

In use, a participating user (at, for example, a business conference) determines that he would like to obtain the contact details of (or even just verify the identity of) a target person in the room. The user points the image acquisition device 12 at the target person and captures an image of the target person. The microprocessor 18 performs any necessary pre-processing of the image, such as framing the necessary facial features and discarding other portions of the captured image that are unnecessary to an image matching process. The pre-processing may also include data compression or determination of essential parametric data from the captured image that will be used in an image comparison operation.

Preferably, the pre-processing operation reduces the quantity of image data necessary for comparison of the image data with a database of candidate person image data items to a bare minimum. This is particularly relevant where only low bandwidth communications channels 40, 41 between devices are available.

After any pre-processing, the captured image data is transmitted to other user devices 21, 31 using the available communications channels 40, 41. Preferably the captured image data is broadcast to all user devices 21, 31 in range of the participating user device 11.

In a more sophisticated arrangement, a multi-cast transmission to selected categories of other user devices may be used. For example, the multi-cast address may effectively eliminate transmission to devices already known to the initiating user device (eg. those belonging to members of the same organisation, who are clearly already known to the user). In this way, data transmission overhead may be reduced.

Broadly speaking, the group of other user devices 21, 31 to which the target image data is broadcast or multi-cast effectively defines a database of image data and personal data for each of a plurality of candidate persons. The database is, of course, effectively a distributed database across all the other user devices that are within broadcast range of the user device 11. In a general sense, the database could be even further distributed, in that each user device may either hold the relevant image data and/or personal data, or may merely hold a data reference or pointer to the relevant data at another location, for example, an internet web page address. A particular device may support multiple users, allowing a particular user of a given device 11, 21, 31 to load or make active their corresponding image data 15, 25, 35 and personal data 16, 26, 36.

All user devices 21, 31 receiving the target image transmission then compare the target image data received with their own "candidate" image data 25, 35. If a match is detected, the target user device that detects the match (eg. device 21) then determines whether to transmit the personal data 26 to the user device 11 originating the target image data. This will depend upon the settings applied by the user of device 21, using control function 27. This may also depend upon the identity of the user device 11.

If the control function 27 determines that the personal data 26 may be transmitted to the user device 11, then the personal data is transmitted using the communications channel 40. Upon receipt of the personal data, the user device 11 displays this on display device 14 and/or saves the information to a user address book or other suitable memory location. The user device 11 may alternatively or additionally present the personal data to a user as an audio output, for example, using a voice synthesiser.

Some example user options would be:

1. Enable Recognition:

yes/no

2. Visibility of personal data:

visible to all/certificate required/hidden

3. Use Bluetooth:

yes/no

4. Use infrared:

yes/no

5. Details to be given:

business/social <list all profiles created>

6. Profiles:

business {pointer to business profile on device or remote host} personal {pointer to personal profile on device or remote host}

<create new profile>{user selects this to create a new profile. e.g. holiday, job hunt . . . }

7. Receipts:

{list receipts of all data exchanges}

8. Set image for recognition:

{user has ability to select one or more images for use in recognition}

As already mentioned, the control function 17, 27, 37 of a given device 11, 21, 31 (respectively) allows its user to set criteria concerning which personal data is made available to third parties, to what extent and to whom. A device control function 17, 27, 37 may be provided with a simple enable/disable function which can be used to prevent their device engaging in the above mentioned image recognition/comparison and data exchange processes. However, even when a user does choose to enable this functionality there remains an issue of trust in terms of ensuring that messages exchanged between devices are genuine. In certain cases a user may only wish to make their information available to particular other devices (users) or classes of devices (users) in which case it becomes necessary to establish that an enquiring device is genuine. It is also important to know that communications apparently originating from a particular device actually do originate from that device. Indeed, it may also be preferable to exchange information between devices in encrypted form to avoid interception by other devices. In order to achieve this security it is possible to perform device authentication, data encryption and digital signing of data using any one or more suitable techniques known to the person skilled in the art. However, one particular way is to employ techniques made available by so called 'public key cryptography'.

Taking the example of the above first arrangement of apparatus 10 described with reference to FIG. 1, the operation already described can be modified to use techniques using public-private key cryptography for encryption signing and authentication as follows. Once the device 11 has captured an image of the target person and performed any image preprocessing as necessary, the device 11 sends the captured image data to the other devices as before, but the image data is also signed with a digital signature by device 11. The signature is generated taking into account a private encryption key of device 11 and the captured image data itself. If a device 21, 31 detects a match between the received target image data and their own "candidate" image data 25, 35, the device 21, 31 may choose to check the validity of the digital signature. If the signature is found to be valid the device 21, 31 establishing a match may then transmit the personal data 26, 36, back to participating user device 11. If the signature is invalid, the personal data 26, 36 is not transmitted. Alternatively, a device 21, 31 may choose to check the validity of any digital signature before attempting to establish a match between the received target image data and the devices own "candidate" image data 25, 35. In this case the image comparison stage IS and subsequent stages of the operation will only be performed if validity of the signature is established. In another arrangement, the device 11 only provides a digital signature for the captured image if requested to do so by a receiving device 21, 31 and the receiving device 21, 31 may only bother to make such a request if a successful match is established between received target image data and their own "candidate" image data 25, 35. The device 21, 31 will not transmit personal data 26, 36 unless a digital signature is supplied by device 11 and device 21, 31 may chose to check the validity of the digital signature before transmitting personal data 26, 36.

The process of checking the validity of a digital signature supplied by device 11 requires that the receiving device 21 is in possession of a public key which corresponds to the private key used by device 11 in generating the digital signature.

However, in order to establish that the public key made available to device 21 for checking the validity of the signature really does belong to a particular sender (in this case the user of device 11) the device 21 may establish contact with a trusted certification authority (not shown) over a communications link (not shown). This step is optional.

Optionally, the device which successfully established an image match (in this case device 21) is able to transmit personal data 26 to user device 11 in encrypted form, using the public key of device 11 during encryption with the result that the information can only be decrypted using the private key of device 11, as is available to device 11.

As a further, optional security measure, the personal data transmitted by device 21 is in either clear or encrypted form. This permits device 11 to establish that the message truly originated from device 21 if the validity of the digital signature is established and authenticated. The signing, encryption and authentication processes performed by devices 11, 21, 31 may be performed by their microprocessors 18, 28 and 38, optionally in conjunction with their control function 17, 27, 37 respectively.

Alternatively, the exchange of data between devices could be performed using symmetric key encryption/decryption techniques, and in this case the symmetric key may be securely delivered to devices using public key encryption techniques.

Preferably, the display device 14 displays at least alphanumeric personal data. In a further preferred embodiment, the target user device 21 may transmit image data 25 back to the requesting user device 11 which image is displayed on the display 14. This arrangement allows the user of device 11 to verify the returned image against the real life person observed to ensure that the image comparison operation has been correctly executed. In this arrangement, a high resolution, preferably colour display 14 is needed.

This function may be especially useful where the image matching function detects more than one possible match between the target person image data and the candidate person image data items. Where multiple matches occur, each candidate person image (eg. 25, 35) may be displayed on device 11 for verification by the user to decide which is the correct one.

It will be understood that in the arrangement of FIG. 1, the user device 11 effectively provides an image acquisition device 12 for capturing an image of the target person, a display device 14 for displaying personal data relating to a target person, and control means 17 for controlling access by third parties to the personal data 16 of the participating user stored thereon. A database of stored image data items 25, 35 relating to a plurality of candidate persons and a search engine for matching the captured image to a candidate person image data item is effectively distributed across all of the other user devices 21, 31. The search engine is formed by the captured image data of the target person being compared with candidate image data 25, 35 in devices 21, 31. The comparison operation may be performed by microprocessors 28, 38.

It will be understood that although three user devices 11, 21, 31 are shown, the arrangement is restricted in the number of participating devices only by practical considerations of processing and communications bandwidth.

With reference now to FIG. 2, an alternative arrangement 110 is now described in which a centralised database 105 of candidate person image data items and related personal data is provided. In FIG. 2, reference numerals of parts corresponding to those of FIG. 1 are numbered accordingly by the addition of one hundred, and need not be separately described.

In the arrangement of FIG. 2, a first participating user device 111 includes a digital image acquisition device 112, such as a digital camera, for capturing an image of a target person. The user device 111 further includes a communication device 113 for effecting data transfer with a central database 105. The communication device may be of any suitable type for the intended use as discussed previously.

However, in a preferred arrangement, longer range communication channels are likely and the use of a cellular telephone communication channel is preferred.

The user device 111 also incorporates a display 114 like in the arrangement of FIG. 1. A significant difference between the FIG. 2 arrangement and that of FIG. 1 is that image data 115 providing an image of the user, and personal data 116 relating to the user, are not stored on the user device 111, but on the database 105, for all users.

The user device 111 includes control function 117 which is used to upload the user's image data and personal data to the database 105, and to determine third party access rights thereto. The user of the device 111 is therefore able to insert, edit and restrict the availability of the personal data 116 using the control function 117 in similar manner to that described earlier.

The user device also includes a microprocessor 118 for effecting all necessary data processing operations, as discussed above.

Other participating users of the system each have a respective user device, illustrated as user devices 121 and 131. Each user device 121, 131 is preferably substantially identical to the first user device 111.

In use, the operation of the arrangement of FIG. 2 is similar to that of FIG. 1. The significant difference is that the captured image data (which may be after any pre-processing) of the target is transmitted to the database 105 rather than to other user devices 121, 131. The search is performed by apparatus in communication with the database, which apparatus may be associated with the database.

If a match (e.g. corresponding to the user of device 121) is detected in the database 105, the database determines whether to transmit the personal data 126 to the user device 111 originating the target image data. This will depend upon the third party access settings applied by the user device 121 using control function 127 and possibly also depends on the identity of the user device 111. These access settings may be stored in database 105 but alternatively the database (or the apparatus performing the search) may initiate an enquiry via communications channel 141 to device 121 to determine whether transmission of the personal data 126 to the first user device 111 is permitted.

If third party access rights permit, the personal data 126 is transmitted to the user device 111 using the communications channel 140. Upon receipt of the personal data, the user device 111 displays this on display 114 and/or saves the information to a user address book or other suitable memory location.

It will be understood that in the arrangement of FIG. 1, the user device 11 effectively provides an image acquisition device for capturing an image of the target person, a display device for displaying personal data relating to a target person, and control means for controlling access by third parties to the personal data of the participating user stored thereon. A database of stored image data items relating to a plurality of candidate persons and a search engine for matching the captured image to a candidate person image data item is effectively provided centrally to all of the other user devices.

With the centralised database system of FIG. 2, there is not necessarily any enforced proximity of user devices making queries (as there could be by the communication channel in FIG. 1). Therefore, it may be desirable to impose some geographical limitations on the extent of search. The database 105 may limit the search of candidate image data items to those that relate to user devices clearly in the same geographical area as the participating user device that sends the target image data.

This geographical search limitation can be achieved in a number of ways. Where a cellular telephone communication channel is being used, the geographical location may be obtained from the operating cells of the relevant devices. Alternatively, each user device may routinely provide a location update to the database according to a GPS fix. Alternatively, a simple user registration procedure may be provided, in which each user attending a conference, for example, may voluntarily enter their location or attendance at the conference. Alternatively, a conference organiser may provide a local database specific to the conference that can be preloaded with the relevant image data and/or associated personal data of conference attendees and/or specific third party access rights upon registration of the participants (this could be database 105). The search engine may be incorporated in database 105.

With reference to FIG. 3, a modification of the arrangement of FIG. 2 is illustrated. In this arrangement 210, a centralised database 205 is still accessed by user devices 211, 221, 231. Communication with the database 205 is effected using cellular telephone links 240, 241, 242, which connect the user devices with a network 250, internet gateway 251 and internet 252, to a server 253 coupled to the database 205.

In this arrangement, the server 253 provides the search engine for matching the captured image data of the target person to a candidate person image data item in the database 205.

The system optionally has the facility to ensure that personal user data is released from the database according to access rights settings that were in place at the time the users image was captured by a third party device. One simple way would be to take into account the time when the image of the target person was created and to only provide personal details according to the third party access rights settings in place at the time the image was created. Alternatively images of the target person can have a time limited validity as far as the database is concerned (in the order of a few seconds to a few minutes). This avoids the problem of a third party capturing an image of a user and interrogating the database 105 at a later time, when the user may well have changed their access rights settings, e.g. from a business profile to a social profile. The same features may be implemented in the apparatus of FIG. 3.

It will be appreciated by the person skilled in the art that the arrangements of FIG. 2 and FIG. 3 could be adapted to incorporate the security features provided by signing, encryption and authentication processes similar to those described with reference to the FIG. 1 arrangement. In this case, the database 105, 205 may optionally act as a trusted certification authority for keys.

It will be understood that a large number of image recognition and matching systems are available in the present state of the art, many of which will be suitable for implementation of the systems described herein.

Preferably, the systems described herein can be implemented on existing available hardware, such as PDA type devices or mobile communicators that have the requisite cameras, by providing suitable software for download, possibly over the internet.

Other embodiments are intentionally within the scope of the accompanying claims.

The invention claimed is:

1. Apparatus for obtaining personal information related to a target person, comprising:

a user device comprising an image acquisition device for capturing an image of said target person;

a database of stored image data items each relating to one of a plurality of candidate persons, each image data item being associated with stored personal data relating to the respective candidate person;

a search engine for matching the captured image of the target person to a candidate person image data item and retrieving the personal data relating thereto, wherein a search is limited to candidate person image data items that relate to further user devices that are in the same geographical area as the user device;

an output device for presenting, to a user, the personal data relating to the target person; and control means, operable by each candidate person, to control third party access to the stored personal data relating to the candidate person.

2. The apparatus of claim 1 in which the database is a distributed database, the candidate persons each having a portable device for storing their own image data items and personal data which may be accessed by the search engine using a wireless communication channel.

3. The apparatus of claim 2 in which the control means comprises an access control function provided on each portable device.

4. The apparatus of claim 1 in which the database includes a central repository accessible to a plurality of remote portable devices using said wireless communication channel.

5. The apparatus of claim 4 in which the control means is a distributed control means, the candidate persons each having a device for storing their own image data items and personal data onto the database and determining third party access rights thereto.

6. The apparatus of claim 1 wherein said portable device is portable electronic device comprising the image acquisition device, output device and control means integrated into said portable device.

7. The apparatus of claim 6 in which the portable electronic device is any of a personal digital assistant, personal computer or mobile telephony device.

8. The apparatus of claim 6 in which the portable electronic device further includes communication means for communication with a remotely located database and the search engine.

9. The apparatus of claim 1 in which the output device is a display device for displaying the personal data relating to the target person.

10. A portable device for obtaining personal information related to a target person, comprising:

an image acquisition device for capturing an image of said target person;

means for accessing a remote database of stored image data items each of relating to one of a plurality of candidate persons, each image data item being associated with personal data relating to the respective candidate person;

means for retrieving the personal data relating to a candidate person for which the captured image data of the target person matches the stored image data item of the candidate person;

an output device for presenting, to a user, the retrieved personal data relating to the target person; and control means to control third party access to the database of personal data relating to said candidate person;

wherein the means for accessing and the means for retrieving include a wireless communication device that is adapted to communicate with a plurality of further portable devices, the further portable devices together forming the remote database; and wherein the range of the wireless communication device limits the further portable devices that form the remote database to the geographical area of the portable device.

11. The portable device of claim 10 comprising a personal digital assistant, personal computer or mobile telephony device having integrated into the portable device.

12. A computer program product, comprising a computer readable medium storing thereon computer program code means adapted, when said program is loaded onto a computing apparatus, to make the computing apparatus form the device of claim 10.

13. A system for providing personal information related to a target person, comprising:

a database of stored image data items each relating to one of a plurality of candidate persons, each image data item being associated with personal data relating to the respective candidate person;

means for receiving, from a remote user device including an image acquisition device, a captured image of said target person;

a search engine for matching the captured image of the target person to a candidate person image data item and retrieving the personal data relating thereto, wherein a search is limited to candidate person image data items that relate to further user devices that are in the same geographical area as the remote user device;

means for transmitting, to a remote output device, the personal data relating to the target person; and control means, operable by each candidate person, to control third party access to the stored personal data relating to the candidate person.

14. A method of obtaining information related to a target person, comprising the steps of:

capturing an image of said target person, the image captured by a user device including an image acquisition device;

supplying image data from the captured image to a database of stored image data items each relating to one of a plurality of candidate persons, each image data item being associated with personal data relating to the respective candidate person;

searching the database to match the captured image of the target person with a candidate person image data item and retrieving the personal data relating thereto, wherein a search is limited to candidate person image data items that relate to further user devices that are in the same geographical area as the user device;

outputting the personal data relating to the target person; and maintaining the database by enabling control, by each candidate person, of third party access to the personal data relating to said candidate person.

15. The method according to claim 14 and further comprising of the step of attaching a digital signature to said supplied image data.

16. The method according to claim 15 wherein the step of said outputting the personal data will not occur unless the attached digital signature is established to be valid and authentic.

17. The method according to claim 14 wherein said step of outputting personal data involves outputting encrypted personal data.

* * * * *